(12) United States Patent
Marc et al.

(10) Patent No.: US 6,293,595 B1
(45) Date of Patent: Sep. 25, 2001

(54) ANTI-ROTATION LOCKING UNITS, AND APPARATUS EQUIPPED THEREWITH

(75) Inventors: Jean-Pierre Marc, Nangis; Bernard Barré, Alfortville, both of (FR)

(73) Assignee: JPB Systeme, Brie Comte Robert (FR)

( * ) Notice: Subject to any disclaimer, the term of this patent is extended or adjusted under 35 U.S.C. 154(b) by 0 days.

(21) Appl. No.: 09/098,529

(22) Filed: Jun. 17, 1998

Related U.S. Application Data

(63) Continuation-in-part of application No. 08/619,563, filed as application No. PCT/FR94/01136 on Sep. 28, 1994, now Pat. No. 5,851,035.

(30) Foreign Application Priority Data

Sep. 29, 1993 (FR) .................................................. 93 11612

(51) Int. Cl.⁷ ...................................................... F16L 55/00
(52) U.S. Cl. ............................................... 285/92; 285/86
(58) Field of Search ......................................... 285/86, 92

(56) References Cited

U.S. PATENT DOCUMENTS

| | | | |
|---|---|---|---|
| 1,580,694 | * | 4/1926 | Smith ................................... 285/86 |
| 3,201,149 | * | 8/1965 | Bragg .................................. 285/86 |
| 4,655,482 | | 4/1987 | Myers et al. . |
| 4,940,260 | | 7/1990 | Odriozola . |
| 5,083,819 | | 1/1992 | Bynum . |
| 5,186,501 | | 2/1993 | Mano . |
| 5,188,398 | | 2/1993 | Parimore, Jr. et al. . |
| 5,348,349 | | 9/1994 | Sloane . |
| 5,362,110 | * | 11/1994 | Bynum .................................. 285/92 |

FOREIGN PATENT DOCUMENTS

| | | |
|---|---|---|
| 577404 | 6/1959 | (CA) . |
| 917287 | 12/1946 | (FR) . |
| 693517 | 7/1953 | (GB) . |

* cited by examiner

*Primary Examiner*—Teri Pham Luu
(74) *Attorney, Agent, or Firm*—Young & Thompson (57) ABSTRACT

An anti-rotation locking unit includes a support member having a mounting portion, a lock-support portion and first engagement part; a locking member having a bearing portion movably supported by the lock-support portion between a locking position and a release position, a coupling formation, and second engagement part, where in the locking position, the first and second engagement parts are mutually engaged so as to prevent rotation of the locking member with respect to the support member; and a return part mounted operatively between the locking member and the support member for biasing the locking member into the locking position, the first and second engagement parts arranged as abutment parts preventing axial movement of the locking member with respect to the support member beyond the locking position.

45 Claims, 6 Drawing Sheets

FIG_2

FIG_3

FIG_4

FIG_5

FIG_7

FIG_8

FIG 12

ANTI-ROTATION LOCKING UNITS, AND APPARATUS EQUIPPED THEREWITH

This is a continuation in part of our application Ser. No. 08/619,563, filed Mar. 27, 1996 now U.S. Pat. No. 5,851,035, which is the national stage of PCT/FR94/01136, filed Sep. 28, 1994.

FIELD OF THE INVENTION

The present invention relates to an anti-rotation locking unit for mechanically and selectively locking two elements against relative rotation thereof.

The invention relates more particularly, but not in a limiting manner, to selective locking of screw connections between two elements, for preventing undesired untightening of such connections. This invention also applies, in a non-limiting manner, to adjustable rods in which a threaded arrangement allows to vary the length of the rod and to secure the length-adjustment which has been made, to clamping collars having a threaded means for adjustable clamping effect of the collar on a clamped element, to pipe couplings using threaded connecting means, especially standardized pipe couplings having a nipple at the end of one of the pipes, intended to be pressed into a flaring at the end of the other pipe under the effect of tightening a captive nut of one of the pipes engaging with a thread formed on the other pipe.

BACKGROUND OF THE INVENTION

Several braking or locking techniques are used at present:

the locking wire technique. This technique, which is much used in the aeronautical field, does not guarantee the mechanical holding together of the assembly. This locking system is more moral than mechanical.

locking techniques using a plastic washer set into a nut, using an elastic or deformed nut, using an elastic washer or using friction. These systems either limit the assembly clearance between the thread of the nipple and the nut, or they increase the torque necessary for loosening. They do not therefore totally guarantee against the risk of the installation becoming loosened during its use.

Most of these techniques cannot be used again after a dismantling.

According to another locking technique known from U.S. Pat. No. 5,083,819, for pipe connections, locking tabs fixed to the nipple resiliently engage the nut. This technique is expensive.

Furthermore, a locking device is known from FR-A-917 287 in which one of the pipes has a thread made beyond splines on which a locking member is slidably mounted. The locking member is biassed by a spring into a locking position in which, in use, said locking member immobilizes the nut carried by the other pipe and engaging said thread. This device is not compatible with the standard couplings since it requires the provision of splines between the thread and the actual piping. The total length of the coupling is modified by this and the total cost is very high. The device according to U.S. Pat. No. 5,188,398 is of the same type but has the additional disadvantage that the splines of the locking member must be strong because they also serve to transmit the tightening torque.

According to U.S. Pat. No. 4,655,482, the nut and the hexagonal conformation of the threaded pipe end are used to rotationally immobilize locking parts which fit over them. The hexagonal conformations of the nut and of the threaded pipe are therefore no longer accessible for the tightening operation. To overcome this, the locking parts have external hexagonal conformations. The radial dimension is increased by the locking parts, which must furthermore transmit the tightening torque.

Thus, most of the known locking devices require an extensive re-designing work of the basic structure comprising the elements to be locked, and that the locking device be an integral part thereof.

SUMMARY OF THE INVENTION

An object of this invention is therefore to provide a locking device which is effective, economical, compact, versatile, and/or compatible with many standards and pre-existing structures without substantially modifying the overall size of the apparatus which is equipped therewith.

A further object of this invention is to provide an anti-rotation locking unit which is easily adaptable to preexisting or predesigned basic structures without significantly or even without altering at all the basic structure.

According to the invention, there is provided an anti-rotation locking unit comprising:

a support member having a mounting portion, a lock-support portion and first engagement means;

a locking member having a bearing portion which is movably supported by said lock-support portion of said support member between a locking position and a withdrawn or release position, a coupling formation, and second engagement means, wherein, at least in said locking position of the locking member, said first and second engagement means are mutually engaged so as to prevent rotation of said locking member with respect to said support member; and a return means mounted operatively between said locking member and said support member for biassing said locking member into said locking position.

The support member is intended or adapted to be made stationary with respect to one of the mutually rotatable elements which are to be selectively locked by the anti-rotation locking unit. The locking unit according to the invention is i.a. suitable to be designed as a separate unit which is ready to be mounted on a basic structure. The mounting consists in securing the support member to one of the mutually rotatable elements of the basic structure, in a location in which, at least in the locking position of the locking member, the locking member coupling formation engages a complementary formation, such as an hexagonal tool-grip formation, provided or preexisting on the other of said two mutually rotatable elements of the basic structure. Thus, the conditions that the basic structure has to fulfil in order to allow adapatation of the anti-rotation locking unit are minimal and, in most cases, correspond to requirements already bearing upon the basic structure for its own operability or compliance with standards.

The locking member is movably mounted onto the support member, and not directly onto said one rotatable element which therefore needs not be modified for this purpose.

The device can be used again after each locking and unlocking sequence.

In the release position, the locking member provides a discoupling between the support member and the complementary coupling formation of said other rotatable element of the basic structure. This can be the result of a discoupling between said first and second engagement means, and/or between the coupling formation of the locking member and the complementary coupling formation of said other element.

It is advantageous that the locking member, when it is in the release position, has a freedom of rotation with respect to the support member. This allows a mounting in which the coupling formation of the locking member and the complementary coupling formation of said other element of the basic structure remain mutually engaged in the release position of the locking member. This is advantageous because the first and second engagement means can be designed for safe reengagement when the locking member moves from the release to the locking position, whereas the coupling formations might be less appropriate therefor.

The engagement of the first and second engagement means can preferably take place in several and even multiple relative angular positions, by choice, of the locking member with respect to the support member. This aids in a safe reengagement in any angular position of the locking member with respect to the support member when the locking member is returned to the locking position from the release position.

If the locking member, when it is in the withdrawn—or release—position, has total freedom of rotation with respect to the support member, the first and second engagement means can consist together of a kind of free wheel allowing the locking member to rotate in the direction of tightening said other element (such as a nut) but not in the direction of loosening it. For this purpose, one of the support and locking members can comprise a set of asymmetrical teeth, and the other one of these members can comprise complementary teeth or simply one or more isolated teeth. The return means allows the teeth of the two members to ride over each other like a ratchet in the direction of tightening the nut. On the contrary, in the direction of loosening, the teeth abut against each other by steep faces.

It is preferable that stop means, constituted by the first and second engagement means or produced separately, define the position of the locking member when it is in the locking position.

In some cases, especially when the basic structure is expected to be of a difficult access, it is advantageous that the locking member remain in the release position only as long as a force is exerted thereupon against the biasing force of the return means. Such a force can be exerted by a tool repelling the locking member for engaging said complementary formation of said other rotatable element. As soon as the tool is withdrawn, the locking member recovers the locking position.

In another embodiment, holding means can be provided for releasably holding the locking member in the release position in order to allow the operator to work freely on the basic structure without having to hold the locking member in the release position.

This holding means can in particular be achieved by a slight cylindrical bulge in a rear section of the support member in order that one or more pins of the locking member engage lightly by elasticity behind this bulge. If the engagement means are of a type which releases the locking member in rotation with respect to the support member when the latter is in the release position, these pins can be constituted by teeth which are at least part of the second engagement means.

Alternatively, the holding function can be provided by engaging such pins, by means of a rotation of the locking member, in one or more recesses associated with each group of teeth which is intended to cooperate with a particular pin, these groups of teeth belonging to the first engagement means.

The holding means are preferably arranged to hold only at the time the operator is working on the basic structure. The locking member must be returned to the locking position after the end of the work. For the case, the operator forgets to do this, the locking unit is preferably capable, under the combined effect of the return means and of any vibrations of the basic structure in use, to recover by itself the locked position. In such a case, if the coupling formations of the locking member and of said other rotatable element do not spontaneously fit together, one external face of the locking member nevertheless brakes said other element due to the thrust of the return means, typically a spring.

This external face of the locking member can have a rough surface condition in order to further increase the braking effect and thus the torque which would be necessary for rotating the rotatable elements with respect to each other. Anyway, if the braking effect is not strong enough, any relative rotation of said rotatable elements should normally bring the coupling formations into a relative angular position in which they will fit together.

According to a further object of this invention, in an apparatus having a first element and a second element which is rotatable with respect to the first element, there is provided an anti-rotation locking device comprising :

a first engagement means which is made stationary with respect to the first element;
   a locking member having coupling means and a second engagement means and which is axially slidable with respect to the first element between a locking position in which said coupling means is capable of coupling for common rotation with said second element whereas said first and second engagement means are in mutual engagement preventing rotation of said locking member with respect to said first element, and a release position in which at least one of said coupling means and said second engagement means is disengaged from said second element and from said first engagement means respectively;
   a return means biasing said locking member into said locking position,
   wherein in said locking position said coupling means is engageable with a tool-grip formation of said second element, and said locking member has a front abutting face around said second element, whereby a tool being axially engaged by a user onto said tool-grip formation simultaneously repells said locking member into the release position against said return means.

According to a still further object of the invention, there is provided an adjustable rod having:

a tubular body provided with an internal threading;
   a threaded shaft threadingly engaged in said internal threading;
   a counternut threadingly engaged on said threaded shaft;
   first engagement means which are integral with said tubular body;
   an annular locking member having a coupling formation and second engagement means, said locking member being axially movable with respect to said tubular body between a locking position in which said first and second engagement means are in mutual engagement and in which said coupling formation is angularly coupled with said counternut when said counternut is positioned adjacent said tubular body, and a release position in which at least one of said coupling formation and said second engagement means are disengaged from said counternut and from said first engagement means respectively;
   return means biasing said locking member into said locking position.

According to a still further object of the invention, there is provided a clamping collar having:
- a collar belt terminated by two end-blocks at least one of which is tubular;
- a threaded bolt extending through said tubular end-block and engaging said other end-block, thereby to be operable to draw said end-blocks towards each other and correspondingly tighten said collar-belt;
- a tool grip element operatively connected to said threaded bolt;
- first engagement means which are integral with said tubular end-block;
- an annular locking member having a coupling formation and second engagement means, said annular locking member being axially movable with respect to said tubular end-block between a locking position in which said coupling formation engages said tool grip element thereby to be angularly fast therewith and in which said first and second engagement means are in mutual engagement, and a release position in which at least one of said coupling formation and said second engagement means are disengaged from said tool-grip element and from said first engagement means respectively;
- return means biassing said locking member into said locking position.

Other features and advantages of the invention will furthermore emerge from the following description relating to non-limiting examples.

DESCRIPTION OF EMBODIMENTS

As shown in FIGS. 1A, 1B, 2 and 3, the locking device according to the invention is adaptable to a pipe coupling comprising a first end-piece 1, or nipple, integral wit the first one of the pipes to be connected, a second end-piece 31 (FIG. 2) rendered integral with the second one of the pipes to be connected, and a nut 2.

The end-pieces 1 and 31 comprise at their free ends a male sealing shaped portion 32 of ovoid shape and a female sealing shaped portion 33 of truncated cone shape respectively, intended to bear against one another in a fluid-tight manner. Starting from the ovoid sealing shaped portion 32, the nipple 1 comprises a male thread 34 and then a collar 36 carrying on its periphery a rotational grasping conformation such as a hexagonal tool-grip conformation 37.

The nut 2 comprises at its rear end, remote from the end-piece 1, an internal collet 38 and an external rotational grasping conformation 9 such as a hexagonal tool-grip conformation. The internal collet 38 engages the second end-piece 31 behind a shoulder 39 of the second end-piece 31. The shoulder 39 faces away from the first end-piece 1 in order to retain the nut 2 captive and in order to receive from the nut 2 a force tending to press the sealing conformation 33 in a fluid-tight manner against the sealing conformation 32 of the end-piece 1.

The nut 2 furthermore comprises, starting from its front end facing the end-piece 1, a female thread 41 capable of cooperating with the thread 34 of the end-piece 1 in order to produce the previously-mentioned tightening force.

The locking device according to the invention comprises a support member 3, or fixed cup, comprising at its rear end a collet 42 fixed for example by soldering against the front face, facing towards the second end-piece 31, of the collar 36. The periphery of the fixing collet 42 is rigidly connected to the rear end of a skirt 43 which extends towards the second end-piece 31 about the thread 34 of the nipple 1. The diameter of the skirt 43 is sufficient for there to be, between the thread 34 and the internal surface of the skirt 43, an annular gap allowing the penetration by the nut 2 when it is being screwed on the thread 34.

In the vicinity of its free end, facing the end-piece 31, the skirt 43 has on its external periphery an annular collar 44 whose shoulder-face facing away from the end-piece 31 consists of first engagement means in the form of a set of teeth 6 with axially protruding teeth.

The locking device furthermore comprises a locking member 4, or mobile cup, which is fitted onto the skirt 43 of the fixed cup 3 with freedom to slide in the longitudinal direction. In order to allow this, the mobile cup 4 has a cylindrical wall whose internal diameter corresponds to the external diameter of the collar 44 of the fixed cup 3 and has at its end facing the first end-piece 1 a bearing portion in the form of a rim 46 for sliding substantially without play over the skirt 43 axially behind the collar 44. At the same time, due to the rim 46, the mobile cup 4 is rendered captive to the fixed cup 3 and the longitudinal sliding motion of the mobile cup 4 with respect to the fixed cup 3 is limited by axial abutment of the rim 46 against the collar 44.

Figures 1A, 1B:
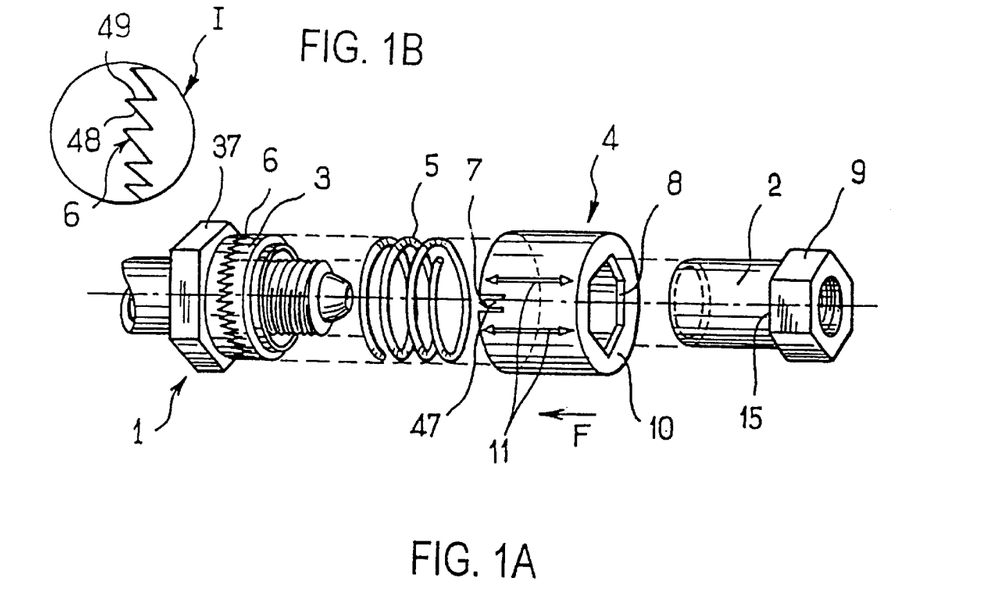
FIG. 1A is a partially exploded perspective view of a first embodiment of the invention, the pipe associated with the nut not being shown.
FIG. 1B is a detail of FIG. 1A, in an enlarged scale.
Figure 2:
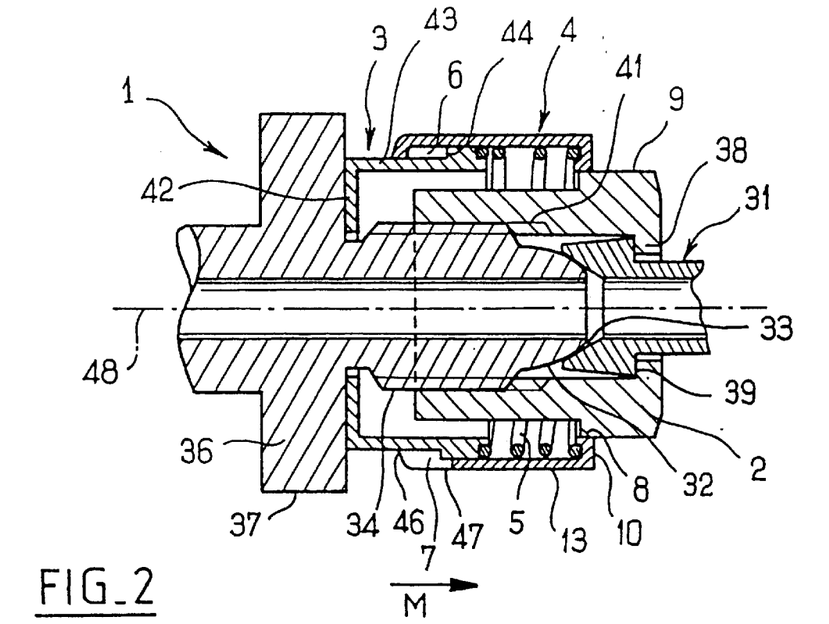
FIGS. 2 and 3 are two axial cross-sectional views of the device shown in FIG. 1A, when the locking member is in the locking position and the release position respectively.

As best shown in FIG. 1, in at least one place in the periphery of its rear edge (FIG. 1), the mobile cup 4 carries two axial slots defining between them a second engagement means in the form of a tongue 47 having a certain radial flexibility and carrying, on its face facing radially inwardly, a tooth 7 which engages in the teeth 6 of the fixed cup 3 when the mobile cup 4 is in the locking position shown in FIG. 2. Because of this engagement, the mobile cup 4 is then prevented from rotating with respect to the fixed cup 3 about the axis 48 of the device.

Figure 3:
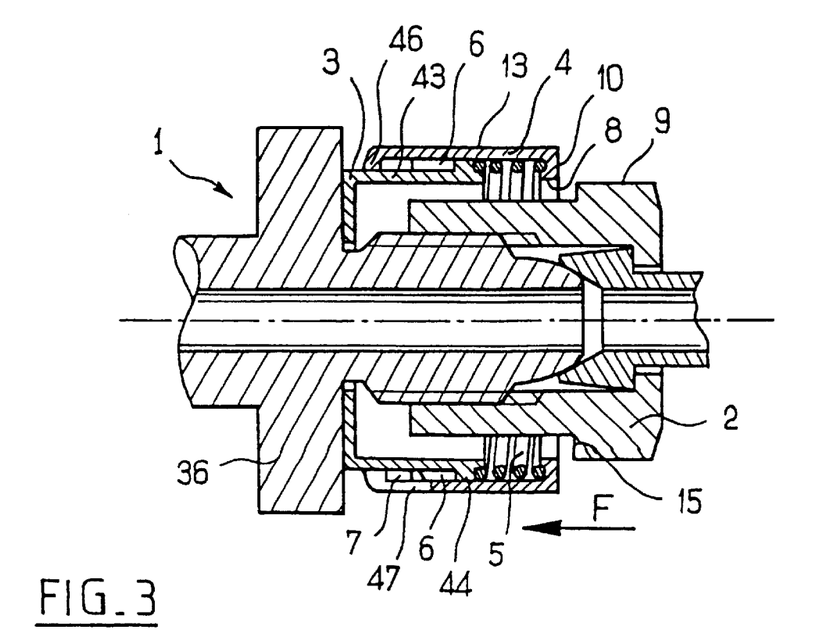

On the other hand, in the withdrawn position of the mobile cup 4, shown in FIG. 3, in which the mobile cup 4 is pushed back towards the collar 36 of the nipple 1, the rim 46 of the mobile cup 4 is axially separated from the collar 44 of the fixed cup 3 and the tooth 7 is disengaged from the teeth 6.

At its end facing the end-piece 31, the mobile cup 4, which is of a generally cylindrical shape, has a collet 10 defining by its radially internal periphery a hexagonal shaped female portion or orifice 8 constituting a second coupling means which is complementary to the first coupling means provided by the hexagonal shaped portion 9 of the nut 2. When the nut 2 is tightened on the thread 34 of the nipple 1 and the mobile cup 4 is in the locking position shown in FIG. 2, the shaped portion 8 of the mobile cup 4 is fitted on the complementarily shaped first coupling means constituted by the hexagonal conformation 9 of the nut 2. This immobilizes the nut 2 in opposition to any rotation relative to the nipple 1, by the intermediary of the mobile cup 4 which is itself prevented from rotating with respect to the fixed cup 3 by the engagement of the tooth 7 in the teeth 6.

On the contrary, when the mobile cup 4 is in its withdrawn position as shown in FIG. 3, the second coupling means 8 of the mobile cup 4 clears the first coupling means or hexagonal conformation 9 of the nut 2 and thus allows the nut 2 to be screwed or unscrewed with respect to the nipple 1.

A compression coil spring 5 is fitted between the collar 44 of the fixed cup 3 and the collet 10 of the mobile cup 4 in order to bias the mobile cup 4 towards its locking position, in the direction M (FIG. 2). Because of this, the locking is carried out and maintained automatically once the nut has been tightened. If the operator carries out the locking with care, he chooses an appropriate angular position of the mobile cup 4 about the axis 48 by rotating the mobile cup 4 with respect to the fixed cup 3 in the withdrawn position, then he leaves the spring 5 to push the mobile cup 4 into the locking position. If, on the contrary, the operator leaves the spring 5 to push the mobile cup 4 towards the nut 2 without taking any particular precaution with regard to the angular position of the mobile cup 4, the shaped portion 8 of the mobile cup 4 and the shaped portion 9 of the nut 2 will not necessarily be in correctly aligned angular position but there will however be a certain locking effect produced between the nut 2 and the mobile cup 4 whose tooth 7 is already engaged in the teeth 6 of the fixed cup 3. If, despite this, the nut tends to loosen, it will quickly reach a position in which the mobile cup 4 would be able to move into the full locking position and any additional loosening would be prevented.

In order that the locking effect between the locking cup 4 and the nut 2 would be substantial in the event of incomplete locking, the external face of the collet 10 and the shoulder 15 (FIGS. 1 and 3) of the nut 2 against which it will rub can have a rough surface condition, or irregularities, or any other constitution capable of increasing the coefficient of friction between them.

The locking device according to the invention can be embodied as a subassembly or unit comprising the fixed cup 3, the mobile cup 4 and the spring 5. This subassembly can then be fitted as one piece over the nipple 1 from its free end until the collet 42 comes to bear against the collar 36 and is appropriately fixed, for example by means of soldering. Consequently, the locking device according to the invention can be fitted to standard and even to pre-existent piping.

In a variant illustrated by the detail I in FIG. 1B, the teeth 6 can be asymmetrical in order to allow rotation of the mobile cup 4 in the sense of screwing up the nut 2 even when the mobile cup 4 is in the locking position, because of a relatively shallow slope of the faces 48 of the teeth against which the tooth 7 bears in this direction of rotation. On the contrary, the other face 49 of the teeth 6 is very steep in order to prevent the mobile cup 4 from rotating in the sense of unscrewing the nut 2 when the mobile cup 4 is in the locking position. The use of the device is thus simplified because it is no longer necessary to put the mobile cup 4 in the withdrawn position manually in order to able to tighten the nut 2. The mobile cup 4 allows to be rotated in the sense of tightening the nut. On the contrary, it is necessary to move the cup 4 into the withdrawn position in order to carry out a loosening operation.

As shown in FIG. 2, when the mobile cup 4 is in its natural locking position because of the action of the return spring 5, it extends axially more or less up to the free end of the nipple 1 and consequently the fixed cup 3 and the mobile cup 4 are capable of jointly providing protection to the nipple 1 and in particular to the thread 34 and the sealing conformation 32 when the two pipes are uncoupled, in particular with respect to mechanical damage.

The spring 5 is also protected. Furthermore, when the two pipes are coupled, the fixed 3 and mobile 4 cups protect the coupling assembly and the spring. On the contrary, the hexagonal conformation 37 of the end-piece 1 always remains accessible.

The external surface condition of the mobile cup 4 is made non-slip in order to facilitate good manual grasping in order to apply a force in the direction F (FIGS. 1 and 3). Markings 11 (FIG. 1) such as arrows can be engraved to indicate the direction of locking and unlocking.

Figure 4:
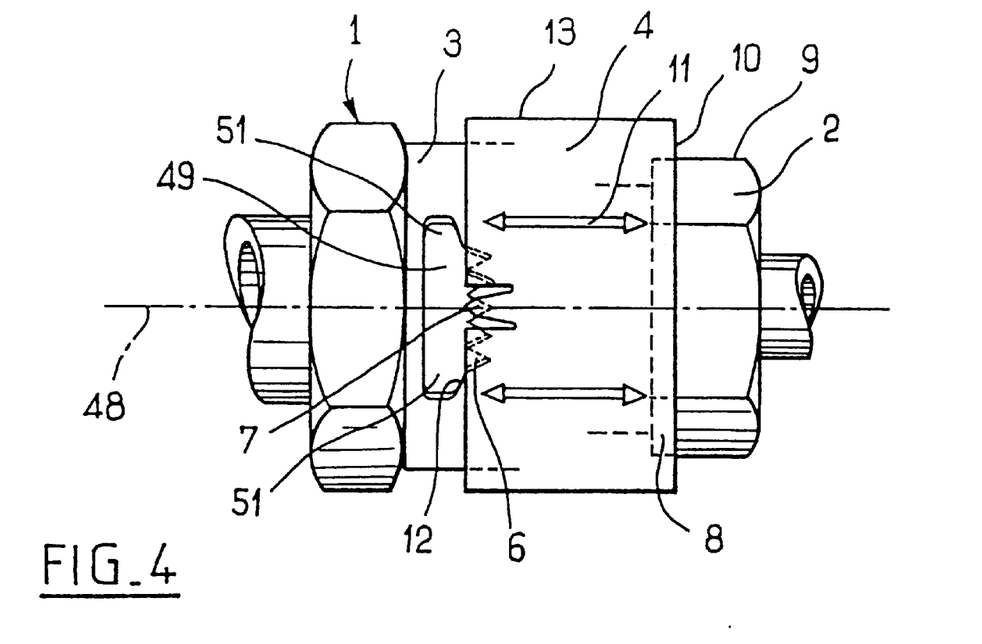
FIGS. 4 and 5 are two side elevation views of a second embodiment of the locking device, when the locking member is in the locking position and in the release position respectively.
Figure 5:
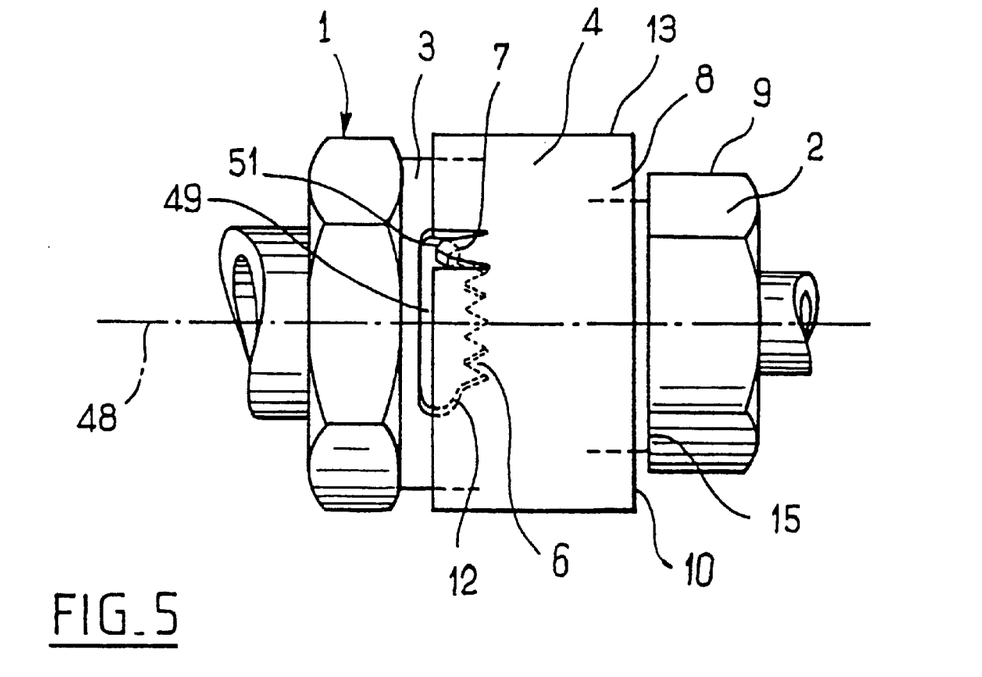

The example shown in FIGS. 4 and 5 will only be described where it differs with respect to the one shown in FIGS. 1 to 3.

The set of teeth 6 no longer extends over the whole of the periphery of the fixed cup 3 but only over a certain angular range about the axis 48. This angular range corresponds to the angular stroke which is necessary for the movable cup 4 to find in all cases an angular position of mutual fit between the coupling formations of the movable cup 4 and of the nut 2, respectively. With hexagonal formations, the angular range is thus ⅙th of a turn, i.e. about 60°. Teeth 6 form a section of the periphery of an opening 49 formed in the external lateral wall of the fixed cup 3 and in which the tooth 7 is captive.

The opening 49 has a greater angular extent in a region occupied by the tooth 7 when the mobile cup 4 is in the withdrawn position (FIG. 5) than along the set of teeth 6. This defines two slots 51, each located at one of the ends of the set of teeth 6, which can receive the tooth 7 when the mobile cup 4 has been moved into the withdrawn position and then turned through a certain angle as shown in FIG. 5. The tooth 7 then bears against a stop edge 12 of the slot 51 which it occupies. Consequently, the cup is held in the withdrawn position against the action of the return spring (not shown in FIGS. 4 and 5) to allow the operator to screw or unscrew the nut 2 without being hindered by the mobile cup 4.

The stop edges 12 of the slots 51 have, with respect to the circumferential direction, a certain slope tending to make the tooth 7 slide towards the teeth 6. Thus, the holding of the tooth 7 by the slots 51 is unstable. In particular, if the operator has forgotten to lock the nut 2 after having tightened it, the vibrations and other functional movements which the piping can experience end up by causing the spontaneous return of the mobile cup 4 towards the locking position.

Figure 6:
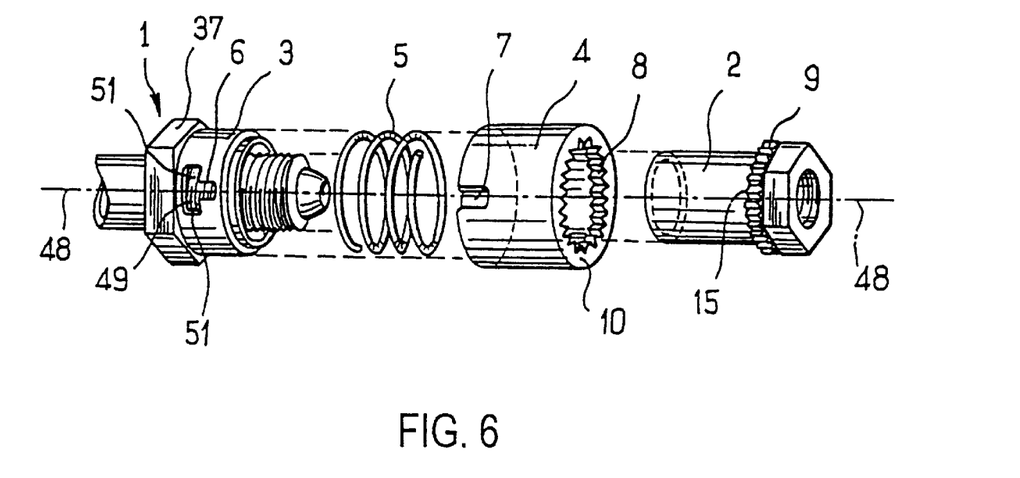
FIG. 6 is a partially exploded perspective view of a third embodiment of the invention.

The embodiment of FIG. 6 will only be described where it differs from the one shown in FIGS. 4 and 5.

The shaped portion 8 of the mobile cup is formed by a set of teeth of relatively short pitch, whose teeth are oriented towards the axis 48. The shaped portion of the nut 2 consists of a complementary set of teeth 9 which can be formed directly on the nut, or which has been formed on a ring which has then been fitted simply by slipping it over the nut and then fixing it against the hexagonal head.

With shaped portions of such a short pitch, it is no longer strictly necessary to provide several locking positions for the mobile cup 4 with respect to the fixed cup 3. That is why, in the example shown in FIG. 6, in the locking position, the tooth 7 of the mobile cup 4 penetrates into a retaining means consisting of a single recess 6 formed with a corresponding shape in the fixed cup 3.

The recess 6 is part of an opening 49 which is circumferentially widened in a region occupied by the tooth 7 when the mobile cup 4 is in the withdrawn position, in such a way as to form two slots 51, as described with reference to FIGS. 4 and 5.

Figure 7:
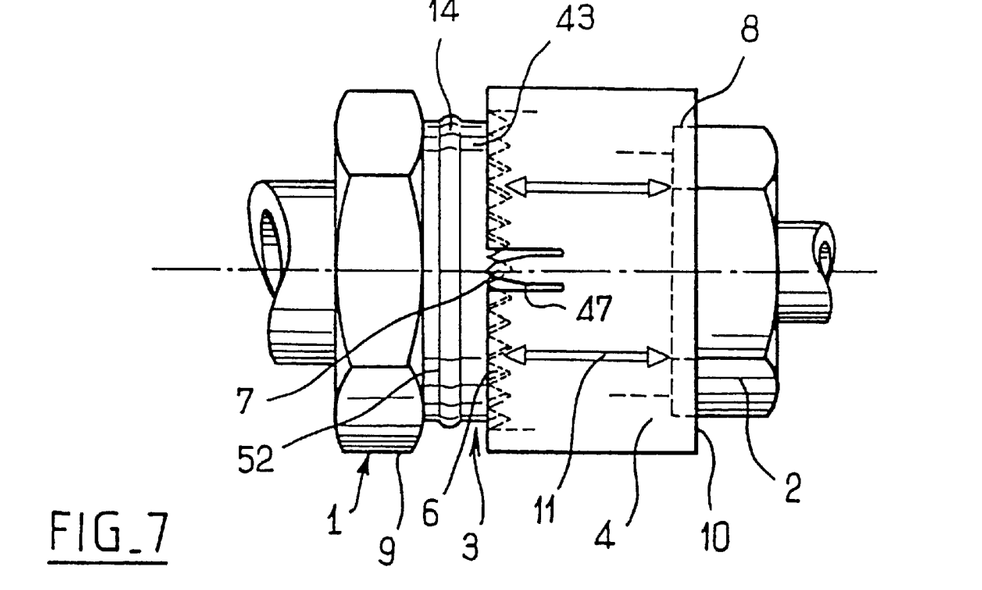
FIGS. 7 and 8 are side elevation views of a fourth embodiment of the invention, when the locking member is in the locking position and in the release position respectively.
Figure 8:
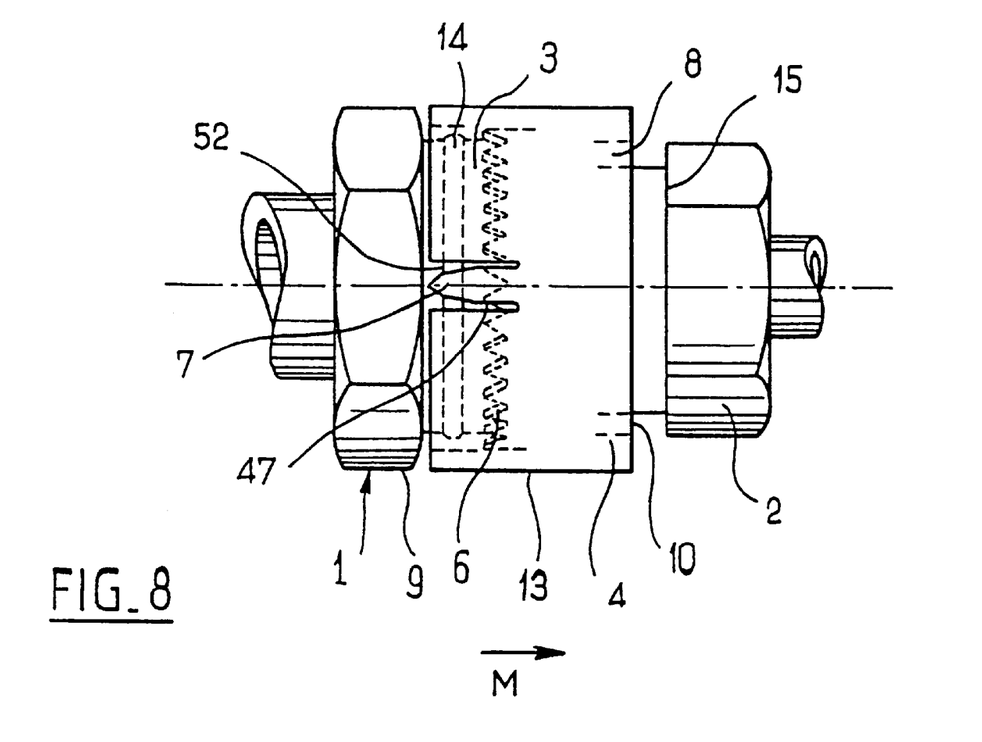

The embodiment of FIGS. 7 and 8 will only be described where it differs from the one shown in FIG. 2.

The skirt 43 of the fixed cup 3 has between the teeth 6 and its rear end, an annular bulge 14 which the tooth 7 must pass over when the mobile cup 4 comes into its withdrawn position. In this way, in the withdrawn position, the mobile cup 4 is engaged in a pawl-like reversible manner behind the slight shoulder 52 formed by the bulge 14 on the side nearest the rear end of the skirt 43 against the action of the return means which are not shown in this figure. This pawl-like engagement is allowed by resilient bending of the tongue 47 carrying the tooth 7.

In order to bring the mobile cup 4 into the locking position, it suffices to apply a light force in the direction M (FIG. 8), or to leave the vibrations to act as has been stated above.

Figures 9, 10, 11:
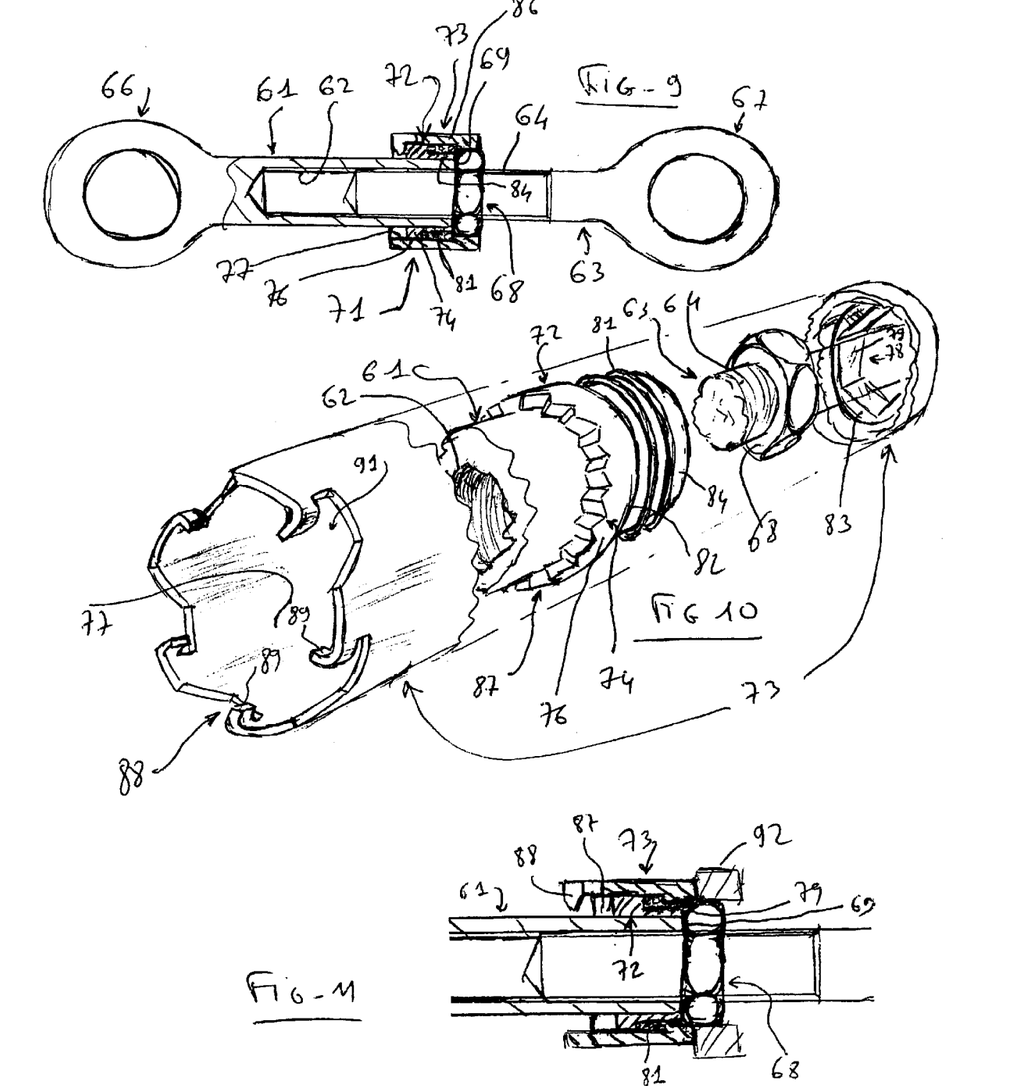
FIG. 9 is an elevational, partly sectional view of an adjustable rod, with the locking member in the locking position.
FIG. 10 is an exploded perspective view of the rod of FIG. 9 with torn-away parts.
FIG. 11 is an enlarged detail of FIG. 9, with the locking member being however repelled into the release position by tool.

In the embodiment of FIGS. 9–11, the basic structure which has to be locked against an undesired rotation therein is an adjustable rod which comprises a tubular body 61 provided with a threaded bore 62, and a shaft body 63 provided with an external threading 64, threadingly engaging said threaded bore 62. Each body 61, 63 is terminated at its end facing away from the other body by a connecting means, 66 and 67 respectively, for connection of the adjustable rod to other mechanical means, not shown. In the example, the connecting means 66, 67 are shown as being pivot joint means. Adjustment of the length of the rod is performed by adjustably screwing the shaft body 63 into or out of the tubular body 61. A counternut 68 threadingly engages the external threading 64 of the shaft body 63 out of the tubular body 61. Once the length of the rod has been adjusted, the counternut 68 is unscrewed along the external threading 64 until it tightly abuts against an end face 69 provided on the tubular body 61 around the opening of the threaded bore 62 of the tubular body 61.

The adjustable rod is provided with a locking unit 71, comprising an annular support member 72 which is rigidly secured around the tubular body 61 adjacent its end face 69, and a locking member 73 which is also annular, surrounds the support member 72 and is movably mounted thereon. The support member 72 is provided with a rear flange 74 at its end which is remote from the shaft body 63. The flange 74 has a peripheral outer face 76 which is cylindrical and is operable as a slide and pivot bearing for the locking member 73 which has a corresponding inner cylindrical slide and bearing surface 77 therefor. The locking member 73 has a front end which projects beyond the support member 72 towards the shaft body 63 and beyond the end-face 69 of the tubular body 61. The front end of the locking member 73 is provided with a front flange 78 (FIG. 10), directed radially inwardly and which has a peripheral inner face 79 which is shaped as a female hexagonal coupling formation. In use, as shown in FIGS. 9 and 11, the coupling formation 79 is permanently coupled for common rotation with the external hexagonal tool-grip formation of the counternut 68 when the counternut 68 is in its normal service position adjacent the end face 69 of the tubular body 61.

A compression coil spring 81 is inserted between a front face 82 of the rear flange 74 of support member 72 and a rear face 83 of the front flange of the locking member 73. Radially speaking, the spring 81 is positioned between a front part 84 of the support member 72, which is radially inside the spring, and an intermediate portion 86 of the locking member 73, which is radially outside. The spring 81 biases the locking member 73 into its locking position, which is a foremost position towards the shaft body 63. First engagement means 87 are formed on a rear face of the rear flange 74 of the support member, facing away from the shaft body 63. Second engagement means 88 are formed at a rear end of the locking member 73. The first engagement means are axial teeth which are consecutively formed around the entire periphery of the support member 72. The second engagement means 88 are radially inwardly projecting teeth 89 which are distributed around the rear end of the locking member 73. As shown in FIG. 10, the teeth 89 are advantageously formed by cutting notches 91 in the rear end of the locking member 73 and bending radially inwardly an initially circumferentially oriented tooth-part which partly closes each notch 91.

In the locking position of the locking member 73, the teeth 89 of the locking member 73 abut against the teeth 87 of the support member 72. This not only provides axial abutment preventing the locking member 73 from moving beyond the locking position towards the shaft body 63, but also provides angular coupling between the locking member 73 and the support member 72, thereby to lock the counternut 68 with respect to the tubular body 61.

If the length of the rod has to be adjusted, an operator axially inserts a tool, such as a wrench 92 (FIG. 11) onto the counternut 68, thereby repelling the locking member 73 into a release position. This axially compresses the coil spring 81 until abutment of the spring coils against each other. Said abutment prevents the locking member 73 from moving back beyond the release position, in which the coupling formation 79 of the locking member 73 is still coupled for common rotation with the counternut 68 whereas the first and second engagement means 87, 88 are disengaged from each other, thereby allowing free rotation of the locking member 73 with respect to the support member 72.

Then, by means of wrench 92, the operator rotates the counternut 68 and the locking member 73 therewith, so as just to loosen the counternut 68 with respect to the end-face 69 of the tubular body 61. Then, the operator preferably removes the wrench 92 thereby leaving the locking member 73 recover its locking position, locking the counternut 68 however in the loosened condition thereof. A length adjustment can then be performed by a relative rotation between the shaft body 63 on the one hand and the tubular body 61 and the counternut 68 on the other hand.

Once the length adjustment has been performed, the wrench is again inserted on the counternut 68, whereby the latter is again unlocked. The counternut 68 is again tightened against the end-face 69 of the tubular body 61, the wrench 92 is withdrawn from the counternut 68, whereafter the coil spring 81 brings back the locking member 73 into the locking position in which the first 87 and second 88 engagement means are again brought into mutual engagement.

From the foregoing description, it will be apparent that the locking unit 71 is an autonomous unit which can be mounted onto the adjustable rod by a mere fixing of the inner face of the support member 72 onto the outer face of the tubular body 61. Before mounting, the three components of the locking unit, i.e. the support member 72, the locking member 73 and the spring 81 are captive of each other. Mounting of the unit consists in inserting spring 81 over the front portion 84 of the support member 72, sliding the locking member over the front end of the support member 72 towards the rear of the device, and then bending the teeth 89 radially inwardly for captively retaining the three components together.

The embodiment of FIG. 12 will be described only as to its differences over that of FIGS. 9–11.

Figure 12:
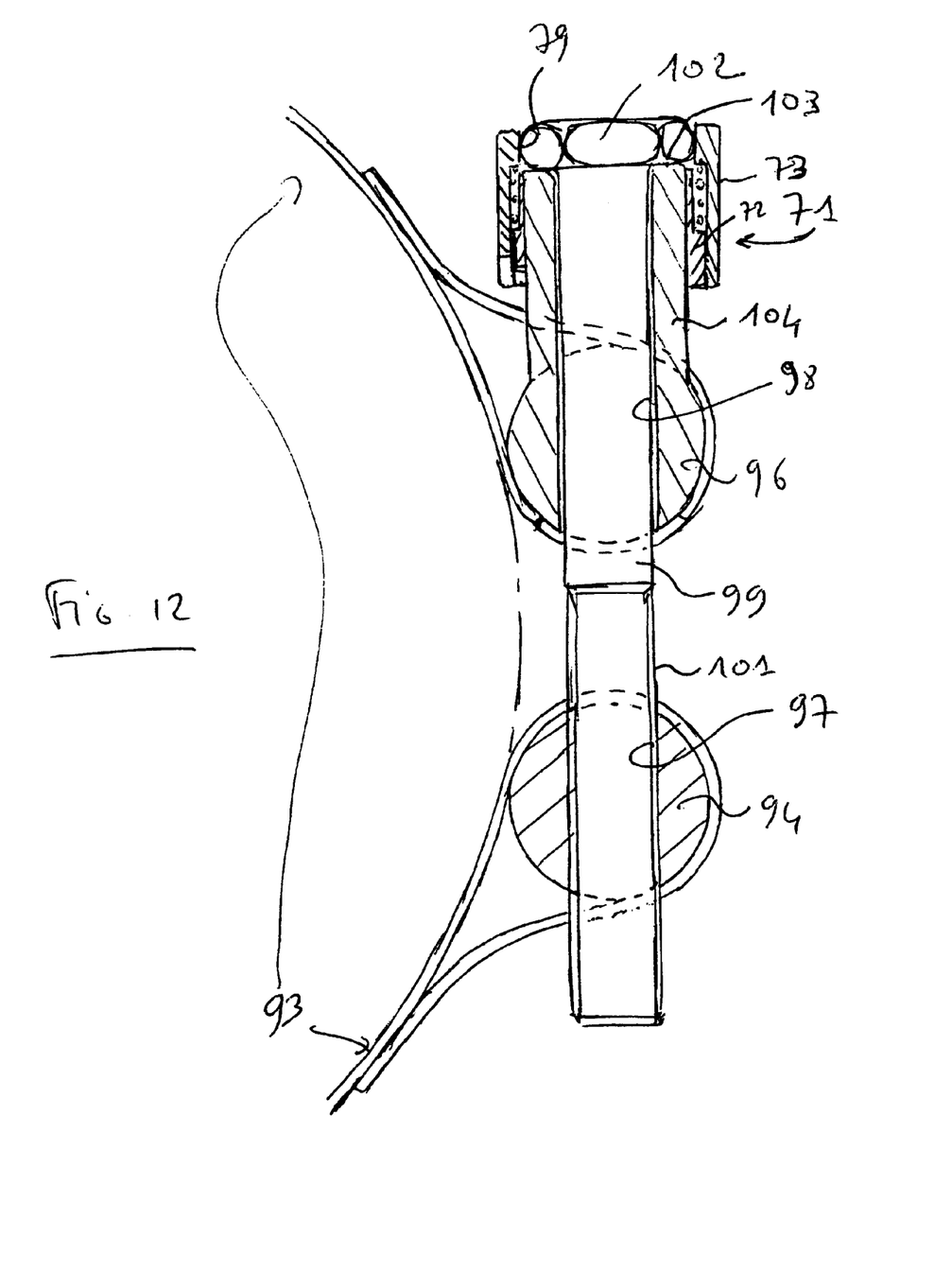
FIG. 12 is a sectional part-view of a clamping collar according to the invention.

In the embodiment of FIG. 12, the basic device is a clamping collar of the kind which can be used for example for clamping one end of a flexible hose (not shown) around a rigid pipe end (not shown). The collar comprises a collar belt 93, which is only partly represented and has two belt ends each of which is secured to an end-block 94, 96. End-block 94 has a threaded bore 97 therethrough, oriented tangentially of the collar belt 93. End-block 96 is provided with a through-hole 98 which, in use, is in line with threaded bore 97. A threaded bolt 99 is slidingly received in through-bore 98 and has an external thread 101 threadingly engaging threaded bore 97. The bolt 99 is provided at its end remote from end-block 94 and thread 101, with an hexagonal bolt head 102. Tightening of the collar belt 93 occurs by rotating bolt 99 by means of a wrench engaging bolt head 102, so as to draw end-blocks 94 and 96 towards each other along the common axis of threaded bore 97 and through-hole 98 while bolt head 102 abuts against an end-face 103 which is provided around the opening of through-hole 98 at its end remote from end-block 94.

End-block 96 is provided with a tubular portion which is terminated by said end-face 103. A locking unit 71 which can be identical to that described with reference to FIGS. 9–11 is mounted onto the tubular portion 104 in such a manner that the locking member 73 is movable between the locking position shown in FIG. 12 in which the coupling formation 79 of the locking member 73 is angularly coupled with bolt head 102 whereas the first and second engagement means of the support member 72 and the locking member 73 respectively are mutually engaged, and a release position in which the first and second engagement means are disengaged from each other whereas, preferably, coupling formation 79 remains angularly coupled with bolt head 102.

As in the foregoing embodiment, movement of the locking member 73 from the locking position to the release position can be produced by insertion of a wrench or other tool onto the bolt head 102.

Although manufacturing of a lockable device such as a lockable adjustable rod or a lockable clamping collar by mounting of an initially autonomous locking unit thereon is preferred, such lockable devices can also be obtained by realising the support member such as 72 and the device element, such as the tubular body 61 of FIGS. 9–11 or the end block 96 of FIG. 12, as one on the same single element.

The materials used for producing the devices and units which have been described hereinabove are chose to be sufficiently strong to guarantee utilization which is, in principle, unlimited. In certain technical fields, these materials can be stainless steels having a resistance to operating temperature greater than that required in order to retain the mechanical properties necessary for their functioning as described hereinabove, or can even be titanium alloy if the required temperature resistance is high.

The locking device according to the invention is particularly intended for use in the field of mechanical industries and more particularly of aeronautics.

The invention is not of course limited to the embodiments described and shown.

The various improvements described are compatible with each other in ways different from those presented in the described embodiments.

What is claimed is:

1. An adjustable rod having:
   a tubular body provided with an internal threading;
   a threaded shaft threadingly engaged in said internal threading;
   a counternut threadingly engaged on said threaded shaft;
   first engagement means which are integral with said tubular body;
   an annular locking member having a coupling formation and second engagement means and which is axially movable with respect to said tubular body between a locking position in which said coupling formation is engageable with said counternut thereby to be rotatably fast therewith and in which said first and second engagement means are in mutual engagement, and a release position in which at least one of said coupling formation and said second engagement means are disengaged from said counternut and from said first engagement means respectively;
   return means biassing said locking member into said locking position.

2. An adjustable rod according to claim 1, wherein said first engagement means belong to a ring-shaped support member secured around said tubular body.

3. An adjustable rod according to claim 1, wherein said first engagement means are formed around said tubular body on an annular face which faces away from said counternut.

4. An adjustable rod according to claim 3, wherein said annular locking member has a first annular end with said coupling means being adjacent thereto and a second annular end with said second engagement means being adjacent thereto.

5. An adjustable rod according to claim 1, wherein, in said release position, said coupling means remain engageable with said counternut and said first and second engagement means are disengaged from each other.

6. An adjustable rod according to claim 1, wherein, in said release position, said first and second engagement means are disengaged from each other and wherein, in said locking position, said first and second engagement means are in axial abutment against each other.

7. A clamping collar having:
   a collar belt terminated by two end-blocks at least one of which is tubular;
   a threaded bolt extending through said tubular end block and engaging said other end-block, thereby to be operable to draw said end-blocks towards each other and correspondingly tighten said collar-belt;
   a tool grip element operatively connected to said threaded bolt;

first engagement means which are integral with said tubular end-block;

an annular locking member having a coupling formation and second engagement means, said annular locking member being axially movable with respect to said tubular end-block between a locking position in which said coupling formation is engageable with said tool grip element thereby to be rotatably fast therewith and in which said first and second engagement means are in mutual engagement, and a release position in which at least one of said coupling formation and said second engagement means are disengaged from said tool-grip element and from said first engagement means respectively;

return means biassing said locking member into said locking position.

8. A clamping collar according to claim 7, wherein said first engagement means belong to a ring-shaped support member secured around said tubular end-block.

9. A clamping collar according to claim 7, wherein said first engagement means are formed around said tubular end-block on an annular face which faces away from said tool-grip element.

10. A clamping collar according to claim 9, wherein said annular locking member has a first annular end with said coupling means being adjacent thereto and a second annular end with said second engagement means being adjacent thereto.

11. A clamping collar according to claim 7, wherein, in said release position, said coupling means remain engageable with said tool grip element and said first and second engagement means are disengaged from each other.

12. A clamping collar according to claim 7, wherein, in said release position, said first and second engagement means are disengaged from each other and wherein, in said locking position, said first and second engagement means are in axial abutment against each other.

13. A clamping collar according to claim 7, wherein said tool-grip formation is a bolt head of said bolt, and said threaded bolt threadingly engages said other end-block.

14. An anti-rotation locking unit comprising:

a support member having a mounting portion, a lock-support portion and first engagement means;

a locking member having a bearing portion which is movably supported by said lock-support portion of said support member between a locking position and a release position, a coupling formation, and second engagement means, wherein, at least in said locking position of the locking member, said first and second engagement means are mutually engaged so as to prevent rotation of said locking member with respect to said support member; and a return means mounted operatively between said locking member and said support member for biassing said locking member into said locking position, and wherein the first and second engagement means are arranged as abutment means preventing axial movement of the locking member with respect to the support member beyond said locking position.

15. An anti-rotation locking unit according to claim 14, wherein in said release position said first and second engagement means are mutually disengaged and said lock support portion rotatably supports said bearing portion.

16. An anti-rotation locking unit according to claim 15, wherein said lock-support portion and said bearing portion are generally cylindrical bearing surfaces.

17. An anti-rotation locking unit according to claim 14, wherein one of said first and second engagement means comprise asymmetrical teeth.

18. An anti-rotation locking unit according to claim 14, comprising means for detachably holding said locking member in the release position against action of said return means.

19. An anti-rotation locking unit according to claim 14, wherein the locking member is generally tubular and surrounds a generally tubular portion of the support member.

20. An anti-rotation locking unit according to claim 14, wherein the first engagement means are provided along an annular end of the support member.

21. An anti-rotation locking unit according to claim 20, wherein said annular end is a rear end which is directed axially away from said coupling formation.

22. An anti-rotation locking unit according to claim 14, wherein the support member has an annular flange having a front face supporting one end of said biasing means, a rear face provided with said first engagement means, and a peripheral face being at least part of said lock-support portion.

23. An anti-rotation locking unit according to claim 14, wherein said second engagement means are provided adjacent a rear end of said locking member, said rear end of said locking member being remote from said coupling means.

24. An anti-rotation locking unit according to claim 14, wherein the locking member has a front flange protruding radially inwardly from a tubular body of said locking member, and wherein the coupling formation is provided on said front flange, a rear face of which is abutted by said return means.

25. An anti-rotation locking unit comprising:

a support member having a mounting portion, a lock-support portion and first engagement means;

a locking member having a bearing portion which is movably supported by said lock-support portion of said support member between a locking position and a release position, a coupling formation, and second engagement means, wherein, at least in said locking position of the locking member, said first and second engagement means are mutually engaged so as to prevent rotation of said locking member with respect to said support member; and a return means mounted operatively between said locking member and said support member for biassing said locking member into said locking position, wherein said coupling formation comprises an internal hexagonally profiled surface.

26. An anti-rotation locking unit according to claim 25, wherein in said release position said first and second engagement means are mutually disengaged and said lock support portion rotatably supports said bearing portion.

27. An anti-rotation locking unit according to claim 26, wherein said lock-support portion of said bearing portion are generally cylindrical bearing surfaces.

28. An anti-rotation locking unit according to claim 25, wherein one of said first and second engagement means comprise asymmetrical teeth.

29. An anti-rotation locking unit according to claim 25, wherein the first engagement means are provided along an annular end of the support member.

30. An anti-rotation locking unit according to claim 29, wherein said annular end is a rear end which is directed axially away from said coupling formation.

31. An anti-rotation locking unit according to claim 25, wherein the support member has an annular flange having a front face supporting one end of said biasing means, a rear face provided with said first engagement means, and a peripheral face being at least part of said lock-support portion.

32. An anti-rotation locking unit according to claim 25, wherein said second engagement means are provided adjacent a rear end of said locking member, said rear end of said locking member being remote from said coupling means.

33. An anti-rotation locking unit according to claim 25, wherein the locking member has a front flange protruding radially inwardly from a tubular body of said locking member, and wherein the coupling formation is provided on said front flange, a rear face of which is abutted by said return means.

34. An anti-rotation locking unit according to claim 33, wherein said internal hexagonally profiled surface is formed as an inner end face of said flange.

35. An anti-rotation locking unit according to claim 25, wherein said locking member has an abutting front surface.

36. An anti-rotation locking unit according to claim 25, wherein said return means is captively mounted between said support member and said locking member.

37. In an apparatus having a first element and a second element which is rotatable with respect to the first element, an anti-rotation locking device comprising:
  a first engagement means which is made stationary with respect to the first element;
  a locking member having coupling means and a second engagement means, said locking member being axially slidable with respect to the first element between a locking position in which said coupling means is capable of coupling for common rotation with said second element whereas said first and second engagement means are in mutual engagement preventing rotation of said locking member with respect to said first element, and a release position in which at least one of said coupling means and said second engagement means is disengaged from said second element and from said first engagement means respectively;
  a return means biassing said locking member into said locking position, wherein in said locking position said coupling means engages a tool engagement formation of said second element, and said locking member has a front abutting face around said second element, whereby a tool being axially engaged by a user onto said tool engagement formation simultaneously repels said locking member into the release position against said return means,
  wherein in said release position the coupling means remain engageable with said tool engagement formation of said second element and said first and second engagement means are disengaged from each other.

38. An anti-rotation locking unit according to claim 37, comprising abutment means preventing axial sliding of said locking member beyond said release position.

39. An anti-rotation locking device according to claim 37, wherein said second element is a threaded element having a hexagonal formation and said coupling means is an internal hexagonally profiled annular surface.

40. An anti-rotation locking device according to claim 37, wherein said apparatus is a clamping collar, said first element is a collar end-block and said second element is a collar-tightening threaded element.

41. In an apparatus having a first element and a second element which is a threaded element having a hexagonal formation and is rotatable with respect to the first element, an anti-rotation locking device comprising:
  a first engagement means which is made stationary with respect to the first element;
  a locking member having coupling means and a second engagement means, said locking member being axially slidable with respect to the first element between a locking position in which said coupling means being an internal hexagonally profiled annular surface is capable of coupling for common rotation with said second element whereas said first and second engagement means are in mutual engagement preventing rotation of said locking member with respect to said first element, and a release position in which at least one of said coupling means and said second engagement means is disengaged from said second element and from said first engagement means respectively;
  a return means biassing said locking member into said locking position, wherein in said locking position said coupling means engages a tool engagement formation of said second element, and said locking member has a front abutting face around said second element, whereby a tool being axially engaged by a user onto said tool engagement formation simultaneously repels said locking member into the release position against said return means.

42. An anti-rotation locking device according to claim 41, wherein in said release position the coupling means remain engageable with said tool engagement formation of said second element and said first and second engagement means are disengaged from each other, and there are provided abutment means preventing axial sliding of said locking member beyond said release position.

43. An anti-rotation locking device according to claim 41, wherein said apparatus is a clamping collar, said first element is a collar end-block and said second element is a collar-tightening threaded element.

44. In a clamping collar having a collar end-block and a collar tightening threaded element which is rotatable with respect to the collar end-block, an anti-rotation locking device comprising:
  a first engagement means which is made stationary with respect to the collar end-block;
  a locking member having coupling means and a second engagement means, said locking member being axially slidable with respect to the collar end-block between a locking position in which said coupling means is capable of coupling for common rotation with said threaded element whereas said first and second engagement means are in mutual engagement preventing rotation of said locking member with respect to said collar end-block, and a release position in which at least one of said coupling means and said second engagement means is disengaged from said threaded element and from said first engagement means respectively;
  a return means biassing said locking member into said locking position, wherein in said locking position said coupling means engages a tool engagement formation of said threaded element, and said locking member has a front abutting face around said threaded element, whereby a tool being axially engaged by a user onto said tool engagement formation simultaneously repels said locking member into the release position against said return means.

45. An anti-rotation locking device according to claim 44, wherein in said release position the coupling means remain engageable with said tool engagement formation of said threaded element and said first and second engagement means are disengaged from each other, and wherein there is provided abutment means preventing axial sliding of said locking member beyond said release position.

* * * * *